United States Patent [19]

Kori et al.

[11] Patent Number: 4,734,808
[45] Date of Patent: Mar. 29, 1988

[54] TAPE GUIDE FOR USE IN TAPE RECORDER

[75] Inventors: Takaaki Kori; Satoshi Ohta, both of Tokyo, Japan

[73] Assignee: Sony Corporation, Tokyo, Japan

[21] Appl. No.: 746,530

[22] Filed: Jun. 19, 1985

[30] Foreign Application Priority Data

Sep. 28, 1984 [JP] Japan .................. 59-203818

[51] Int. Cl.[4] ............... G11B 15/60; B65H 23/04; G03B 1/48
[52] U.S. Cl. .................. 360/130.2; 226/196; 226/199; 242/76
[58] Field of Search ............... 360/130.2, 130.21; 226/190, 196–199; 242/76, 157 R, 157 C

[56] References Cited

U.S. PATENT DOCUMENTS 3,944,122 3/1976 Pellicano .................. 226/198
4,017,897 4/1977 Blanding .................. 226/199
4,155,497 5/1979 Fell .................... 226/199

Primary Examiner—Stuart N. Hecker
Assistant Examiner—David J. Severin
Attorney, Agent, or Firm—Ronald P. Kananen

[57] ABSTRACT

A cylindrical bore of a head member with a coaxial sleeve portion has at one axial end a larger-diameter part, the diameter of which is somewhat larger than the diameter of a cylindrical shaft which is to be press-fitted into the other end of the bore to achieve secure attachment. The large-diameter part ensures that a wear-resistant but fragile tape contact shoe (such as, a shoe made of ceramics) intimately surrounding the sleeve portion of the head member opposite the larger-diameter part will not be cracked or otherwise damaged when the cylindrical shaft is thrust into the cylindrical bore.

9 Claims, 3 Drawing Figures

U.S. Patent     Mar. 29, 1988     4,734,808

TAPE GUIDE FOR USE IN TAPE RECORDER

BACKGROUND OF THE INVENTION

1. Field of the Invention

The present invention relates in general to tape recorders, such as video tape recorders (VTR), audio tape recorders or the like, and more particularly to a tape guide for use in the recorders for guiding movement of the tape.

2. Description of the Prior Art

Hitherto, in tape recorders, various kinds of tape guides have been proposed and put into practical use for smooth running of a tape set in the recorders. However, some of the prior proposed tape guides have suffered from the drawback that a wear-resistant but fragile element, such as a ceramic element, in direct contact with one edge of the running tape to support same, often cracks during assembly due to is inherently weak structure. One previously proposed tape guide will be described hereinafter in order to clarify the invention.

SUMMARY OF THE INVENTION

It is therefore an object of the present invention to provide an improved tape guide which is free of the above-mentioned drawback encountered in prior tape guides.

It is another object of the present invention to provide an inexpensive tape guide which can be easily manufactured with simple production facilities.

According to the present invention, a tape guide for use in a tape recorder includes a generally annular member made of metal with a coaxially projecting smaller-diameter sleeve portion, the annular member having a coaxially extending cylindrical bore therethrough, a ceramic ring coaxially and intimately disposed about the smaller-diameter sleeve portion, adhesive securing the annular member and the ceramic ring together, and a cylindrical shaft coaxially and intimately disposed in the cylindrical bore of the annular member. The cylindrical bore of the annular member comprises a smaller-diameter part, the diameter of which is so selected as to achieve secure connection between the shaft and the annular member when coupled, and a larger-diameter part, the diameter of which is larger than that of the smaller-diameter part. The larger-diameter part extends from the mouth of the smaller diameter sleeve portion to the major portion of the annular member.

Merits of the invention include the following:

(1) A wear-resistant but fragile element (viz., a ceramic shoe for a tape) of the tape guide is assuredly prevented from structural damage during assembly.

(2) The tape guide can be assembled without aid of jigs.

(3) Production of the tape guide parts is achieved by conventional machine tools with ease.

BRIEF DESCRIPTION OF THE DRAWINGS

Other objects and merits of the present invention will become apparent from the following description when taken in conjunction with the accompanying drawings, in which.

DESCRIPTION OF A CONVENTIONAL TAPE GUIDE

Figure 1:
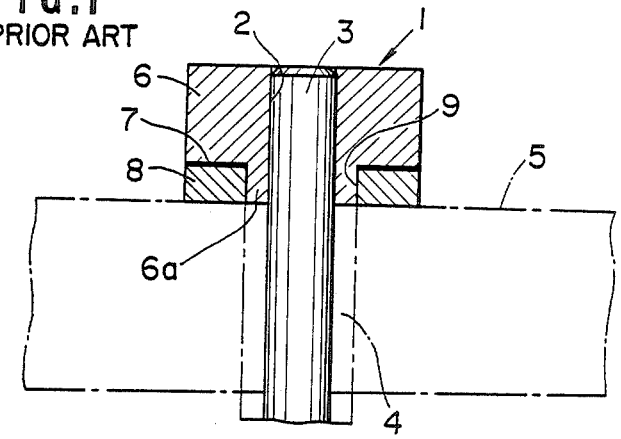
FIG. 1 is a cross-sectional view through a conventional tape guide.
Figure 2:
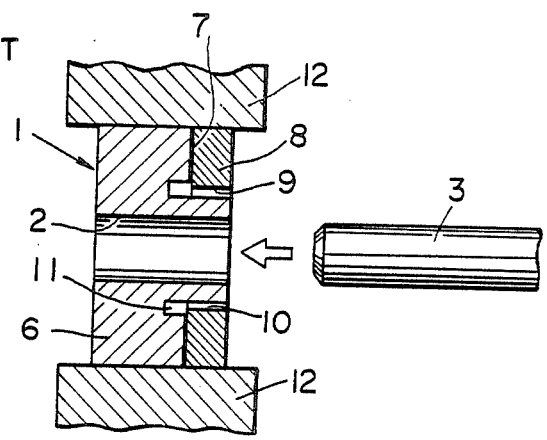
FIG. 2 is a cross-sectional view showing an assembly step for the conventional tape guide of FIG. 1.

Prior to describing in detail the present invention, one conventional tape guide used in existing tape recorders, such as video tape recorders (VTR), sound tape recorders or the like, will be outlined with reference to FIGS. 1 and 2 in order to clarify the features of the present invention.

FIG. 1 shows one conventional tape guide practically applied to existing video tape recorders. The tape guide comprises in general an annular head member 1, a cylindrical shaft 3 tightly received in a bore 2 through the head member 1, and a cylindrical guide roller 4 rotatably disposed about the shaft 3. Designated by numeral 5 is a known video tape which runs longitudinally (that is, laterally in FIG. 1) with one face in contact with the guide roller 4 and one edge (the upper edge in the drawing) in contact with the head member 1.

The annular head member 1 comprises a major member 6 made of a suitable metal and a minor member or ring member 8 (or shoe) made of ceramics which are secured to each other by a suitable adhesive 7. The major annular member 6 has a coaxially projecting smaller-diameter portion 6a about which is disposed the ceramic ring 8. Due to the excellent wear-resistance of the ceramic ring 8, the life of the head member 1 is considerably prolonged despite severe contact pressure from the edge of the tape 5 which runs continuously during operation of the tape recorder.

As is seen from FIG. 2, for assembly, the shaft 3 is pressed into the bore 2 of the head member 1. During insertion of the shaft 3 into the bore 2, the head member 1 is somewhat distended radially outwardly, particularly at the smaller-diameter sleeve portion 6a. Thus, if the smaller-diameter sleeve portion 6a is dimensioned for intimate contact with the center opening 9 of the ceramic ring 8, insertion of the shaft 3 might cause breakage of or damage to the ceramic ring 8, which is relatively fragile.

Thus, usually, the smaller-diameter sleeve portion 6a and the ceramic ring 8 are designed to leave therebetween a considerable annular clearance 10, and an annular recess 11 is machined in the major annular member 6 near the smaller-diameter sleeve portion 6a. During assembly, the head member 1 is tightly held by a jig 12 and the shaft 3 is pressed into the bore 2, as shown in FIG. 2. Provision of the annular clearance 10 ensures that radial expansion of the smaller diameter sleeve portion 6a due to the insertion of the shaft 3 will not severely stress the ceramic ring 8. Thus, the ceramic ring 8 will not break. The annular recess 11 of the head member 1 receives therein a remaining part of the adhesive 7 applied to the annular clearance 10.

However, the above-mentioned assembly step for the tape guide has the following inherent drawbacks. The adhesive 7 used to bond the major annular member 6 and the ceramic ring 8 together sometimes flows out and bonds the head member 1 to the jig 12, thereby preventing easy removal of the head member 7 from the jig 12. Furthermore, a special, expensive machine tool is needed to form the annular recess 11 in the major annular member 6. Furthermore, too many jigs 12 are needed when mass production of the tape guide is required.

DETAILED DESCRIPTION OF THE INVENTION

Figure 3:
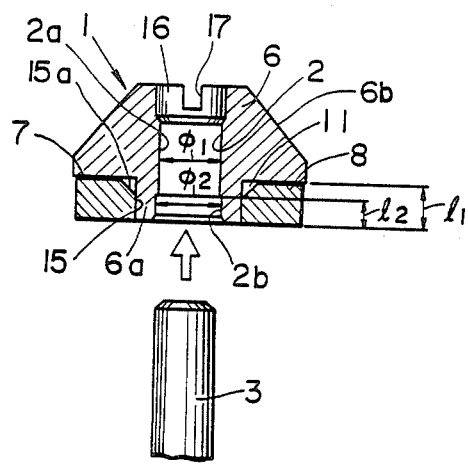
FIG. 3 is a cross-sectional view showing an assembly step for a tape guide according to the present invention.

FIG. 3 shows a tape guide according to the present invention in a partially-assembled state. The tape guide of the invention is free of the above-mentioned drawbacks, as will become apparent as the description proceeds. The tape guide comprises a generally conical head member 1 and a cylindrical shaft 3 which fits tightly into a bore 2 formed in the head member 1. Although not shown in FIG. 3, a guide roller corresponding to the roller 4 of FIG. 1 is rotatably disposed about the shaft 3 for the same purpose as described hereinabove.

The head member 1 comprises a mushroom-shaped major member 6 made of metal and a ceramic ring 8 (or shoe) which are bonded to each other by an adhesive 7. The mushroom-shaped major member 6 has a coaxially projecting smaller-diameter sleeve portion 6a about which the ceramic ring 8 fits snugly. The major member 6 also has a conical surface 6b which tapers inwards towards the top of the head member 1. The smaller-diameter sleeve portion 6a has an axial length $l_1$ which is approximately equal to the thickness of the ceramic ring 8. As shown, the upper, inner cylindrical edge 15a of the ceramic ring 8 is bevelled, so that, upon assembly, an annular space 11 of triangular cross section is defined between the ceramic ring 8 and the major member 6. The annular space 11 accomodates any excess adhesive 7 used to bond the two members 6 and 8. The mushroom-shaped major member 6 is transpierced by a coaxially extending cylindrical bore 2 which comprises a smaller-diameter part 2a passing predominantly through the enlarged portion of the major member 6 and a larger-diameter part 2b passing predominantly through the smaller-diameter sleeve portion 6a of the major member 6. The diameters of these smaller- and larger-diameter parts 2a and 2b are labelled $\phi_1$ and $\phi_2$ respectively in the drawing. The diameter $\phi_1$ is so selected that full insertion of the shaft 3 into the bore 2 brings about secure connection between the shaft 3 and the mushroom-shaped major member 6. The diameter $\phi_2$ is slightly larger than $\phi_1$. As shown, the axial length $l_2$ of the larger-diameter part 2b of the bore 2 is smaller than that $l_1$ of the smaller-diameter portion 6a of the major member 6. Preferably, the larger-diameter part 2b of the bore 2 terminates at or at least in the vicinity of the point opposite the bevelled edge 15a of the ceramic ring 8. The mouth portion of the larger diameter part 2b is chamfered, as shown. Designated by numeral 16 is a cylindrical element which is securely disposed in the upper end of the bore 2. Although not shown in the drawing, a known length-adjusting mechanism is arranged in the lower portion of the shaft 3 for adjusting the axial length of the tape guide when the element 16 and thus the entire tape guide is rotated about its axis. The element 16 has a slit 17 engageable with an operating tool, such as a screw driver, which allows the element 16 to be turned easily.

During assembly, the shaft 3 is pressed into the bore 2 of the head member 1 to the point where the top of the shaft 3 is in contact with the bottom of the element 16. First, the shaft 3 is inserted into the larger-diameter part 2b of the bore 2. Then, the smaller-diameter sleeve portion 6a of the major member 6 can be engaged with essentially no stress being applied by the shaft 3 on the ceramic ring 8. Thereafter, the shaft 3 is press-fitted into the smaller-diameter part 2a for the secure attachment to the head member 1, during which the smaller-diameter portion 6a is somewhat expanded, particularly near the annular space 11. However, the annular space 11 absorbs this expansion, thereby transmitting negligible stress to the ceramic ring 8. Thus, the ceramic ring 8 will not be broken or damaged.

As will be understood from the above description, the tape guide according to the present invention prevents breakage of the ceramic ring 8 during assembly. Furthermore, the adhesive receiving space (that is, the annular space 11) can be easily formed using a conventional and thus inexpensive machine tool. Furthermore, it is not necessary to use a jig to hold the head member 1 during assembly.

What is claimed is:

1. A tape guide, for use in a tape recorder, comprising:
    a rotatable cylindrical shaft;
    a generally annular member having a major part and mounted on said cylindrical shaft for rotation therewith, said annular member being formed with a coaxially projecting sleeve portion axially extending from the major part of said annular member, said annular member being transpierced by a coaxially extending cylindrical bore for receiving said cylindrical shaft, said cylindrical bore comprising a first section extending through said major part and a second section extending through said sleeve portion, said first section having an internal diameter suitable for establishing secure attachment to said cylindrical shaft, said second section being arranged in alignment with said first section and including a first portion having a diameter substantially equal to the diameter of said first section and a predetermined axial length and a second portion having a greater internal diameter than that of said first section, said second section receiving said cylindrical shaft while maintaining a given clearance between the external periphery of said cylindrical shaft and the internal periphery thereof; and
    a ring made of ceramics coaxially and intimately disposed about said sleeve portion for rotation with said annular member, said ring having a bevelled inner edge so that an annular space is defined between said ceramic ring and said annular member, said annular space having an axial length coextensive with the predetermined axial length of said first portion of said second section of said cylindrical bore whereby said second portion having a greater internal diameter than said first section and said annular space reduce stress on said ceramic ring.

2. A tape guide as claimed in claim 1, wherein said annular member is made of metal.

3. A tape guide as claimed in claim 1, wherein said annular member is mounted on said cylindrical shaft in a press fit.

4. A tape guide as claimed in claim 1, wherein said annular space has a triangular cross section.

5. A tape guide as claimed in claim 4, wherein the axial length of said sleeve portion is approximately equal to the axial thickness of the ceramic ring.

6. A tape guide as claimed in claim 1, wherein said sleeve portion includes a chamfer defining a mouth for said second section of said cylindrical bore.

7. A tape guide as claimed in claim 6, wherein a cylindrical element is securely disposed in an upper end of said cylindrical bore for rotation with the annular member, said cylindrical element having a slit engageable with an operating tool.

8. A tape guide as claimed in claim 1, further comprising means, coupled with said annular member, for adjusting an axial position of said annular member relative to said cylindrical shaft.

9. A tape guide as claimed in claim 8, wherein said axial position adjusting means is thread-engageable with said first section of said cylindrical bore to contact with the top of said cylindrical shaft for determining the axial position of said annular member.

* * * * *